US009785794B2

(12) United States Patent
Desai

(10) Patent No.: US 9,785,794 B2
(45) Date of Patent: Oct. 10, 2017

(54) SECURING SENSITIVE DATA ON A MOBILE DEVICE

(71) Applicant: Citrix Systems, Inc., Fort Lauderdale, FL (US)

(72) Inventor: Nitin Desai, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 51 days.

(21) Appl. No.: 14/104,457

(22) Filed: Dec. 12, 2013

(65) Prior Publication Data

US 2015/0169893 A1    Jun. 18, 2015

(51) Int. Cl.
| | | |
|---|---|---|
| *H04L 9/00* | (2006.01) | |
| *G06F 21/62* | (2013.01) | |
| *H04L 12/58* | (2006.01) | |
| *H04W 12/08* | (2009.01) | |
| *G06F 21/55* | (2013.01) | |

(Continued)

(52) U.S. Cl.
CPC ........ *G06F 21/6227* (2013.01); *G06F 21/554* (2013.01); *H04L 51/18* (2013.01); *H04W 12/08* (2013.01); *G06F 2221/2137* (2013.01); *G06F 2221/2143* (2013.01); *H04L 63/108* (2013.01); *H04W 4/001* (2013.01)

(58) Field of Classification Search
CPC ... G06F 21/6227; G06F 21/554; H04L 51/18; H04W 12/08
USPC ................................................. 726/1, 26–30
See application file for complete search history.

(56) References Cited

U.S. PATENT DOCUMENTS

| | | | | |
|---|---|---|---|---|
| 5,958,005 A | * | 9/1999 | Thorne | G06Q 10/107 380/51 |
| 6,324,569 B1 | * | 11/2001 | Ogilvie | G06Q 10/107 709/206 |

(Continued)

FOREIGN PATENT DOCUMENTS

| | | |
|---|---|---|
| EP | 1766885 A1 | 3/2007 |
| WO | 2005/125114 A1 | 12/2005 |
| WO | 2013023179 A1 | 2/2013 |

OTHER PUBLICATIONS

Snapchat: http://en.wikipedia.org/wiki/Snapchat, printed on Dec. 12, 2013.

(Continued)

*Primary Examiner* — Alexander Lagor
(74) *Attorney, Agent, or Firm* — Banner & Witcoff, Ltd.

(57) ABSTRACT

Illustrative aspects described herein relate to data security and automatic deletion of data when specific criteria are met. Sensitive data may be protected when sent over unsecured networks or to unsecured or BYOD devices while preventing data leakage by specifying conditions under which the data is to be automatically deleted. This prevention may involve using a managed application to receive a data message from an application on a sending mobile device, such that the managed application is configure to delete the data message when the specified criteria are met. In one embodiment, the data message may include the criteria which, when met, results in the destruction of the data message, thereby allowing a sender to define the criteria. Once the data message is stored on the second mobile device, the receiving application determines whether the destruction criteria have been met. If so, the receiving application deletes the data message.

8 Claims, 9 Drawing Sheets

(51) Int. Cl.
*H04L 29/06* (2006.01)
*H04W 4/00* (2009.01)

(56) References Cited

U.S. PATENT DOCUMENTS

| | | |
|---|---|---|
| 7,216,297 B1 | 5/2007 | Douglis et al. |
| 2005/0164720 A1 | 7/2005 | Huang |
| 2006/0034494 A1* | 2/2006 | Holloran .................. H04L 9/32 382/116 |
| 2010/0299152 A1* | 11/2010 | Batchu et al. ................. 705/1.1 |
| 2010/0304766 A1* | 12/2010 | Goyal .................... H04L 51/34 455/466 |
| 2013/0219465 A1* | 8/2013 | Tse et al. ........................... 726/3 |
| 2015/0012963 A1* | 1/2015 | Gupta .................. H04L 63/104 726/1 |

OTHER PUBLICATIONS

Blinklink: http://www.blinklink.me/, printed Dec. 12, 2013.
Ben Woods: "Blinklink: Post a picture, tweet it, then watch it disappear until it's tweeted again," Aug. 6, 2013, http://thenextweb.com/apps/2013/08/06/blinklink-post-a-picture-tweet-it-then-watch-it-disappear-until-its-tweeted-again/#!pLMkC, printed Dec. 12, 2013.
Jan. 29, 2015—International Search Report and Written Opinion—App No. PCT/US2014/058813.

\* cited by examiner

SECURING SENSITIVE DATA ON A MOBILE DEVICE

FIELD

Aspects described herein generally relate to networking and communications. More specifically, aspects relate to securing highly-sensitive data sent between computing devices, e.g., by configuring a device to automatically delete data when certain condition(s) is/are met.

BACKGROUND

The securing of data is an important asset for any enterprise. Many Information Technology ("IT") departments attempt to be in complete control over company data, especially with regard to employees' mobile or portable devices, which can be easily lost or stolen. Innovations exist for securing data on an end-user device. For example, there are encryption features and applications that may wipe data in case of theft or loss. However, there is a need for better solutions for sending data messages that include highly-sensitive data to unsecured or Bring Your Own Device ("BYOD") devices without data leakage.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, the specification is directed to adding an additional level of security for highly sensitive data. According to one aspect, once sent, data messages may self-destruct upon meeting certain destruction criteria on a receiving device. This self-destruction would allow data messages to be sent to unsecured and/or BYOD devices without fear of data leakage.

Aspects of this disclosure relate to the automatic destruction of data messages sent to unsecured or BYOD devices.

In one embodiment, an application on a first mobile device sends a message to a managed application on a separate mobile device that has policy files that instruct the managed application to delete the message when certain destruction criteria in the policy files are met. The criteria may include a restriction as to receipt from a particular application or device, a limit as to the length of time the data message has been viewed, the number of times a data message has been viewed, or the knowledge of a security threat to the second device.

Additionally, or in the alternative, a first application on a first mobile device creates a data message including destruction criteria to send to a managed application on a second mobile device. These criteria, if met, cause the self-destruction of the message. A managed application on a separate mobile device receives the data message and receives policy files instructing the managed application as to the criteria of the data message. The managed application uses those criteria to determine whether the data message should be deleted.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards preventing the unauthorized distribution of enterprise data by configuring a framework of devices to automatically delete data when one or more predefined conditions occur. By automatically deleting data without user input (and without allowing a user the ability to prevent the deletion), the data may appear to the user to have self-destructed.

In order to control the unauthorized distribution of data from mobile and BYOD devices, aspects described herein may control remote access to resources at an enterprise computing system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices. Further the subject matter includes managed applications sending and receiving highly-sensitive data over unsecured networks and to unsecured mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
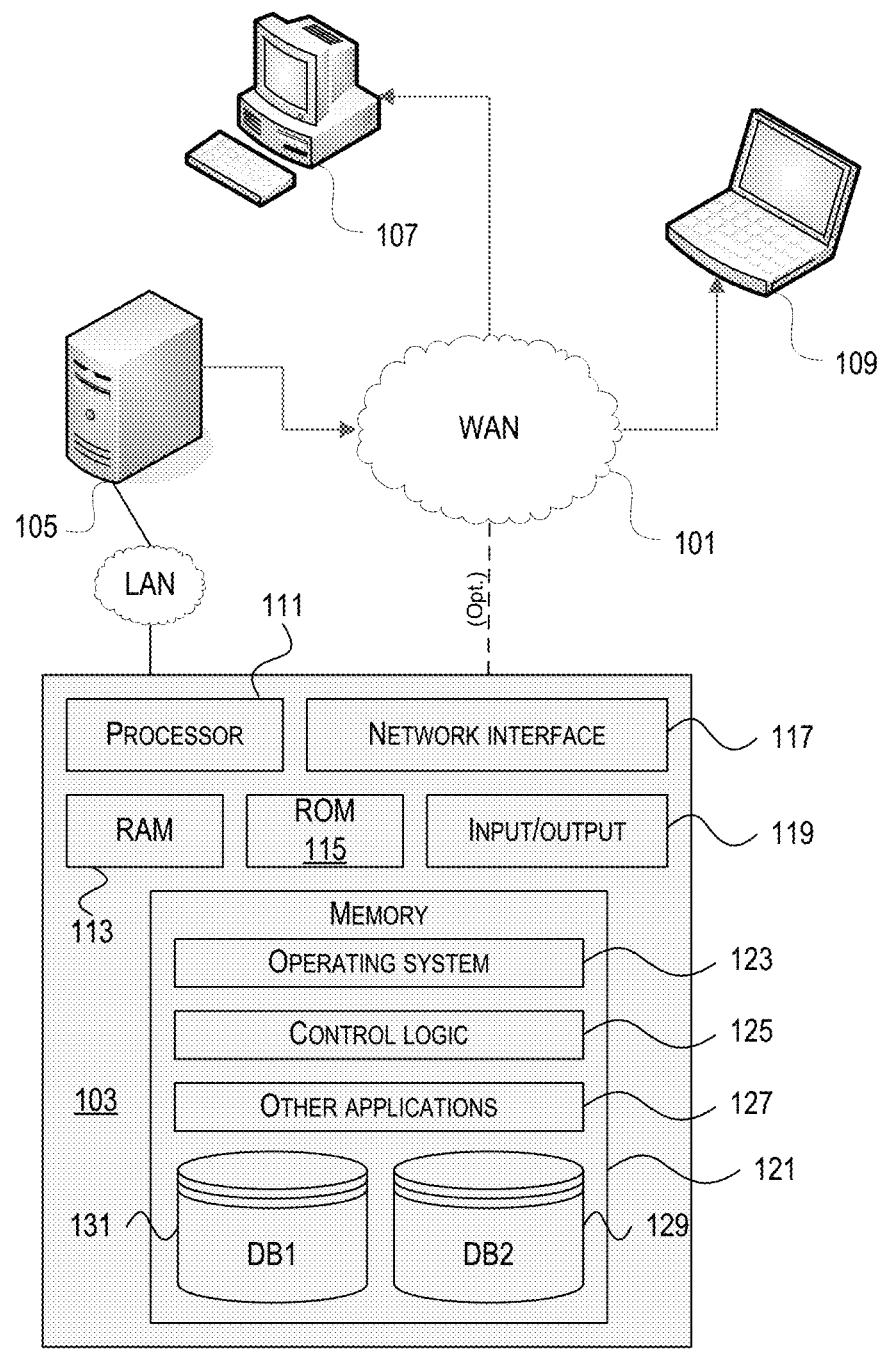
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Enterprise Mobility Management Architecture

Figure 2:
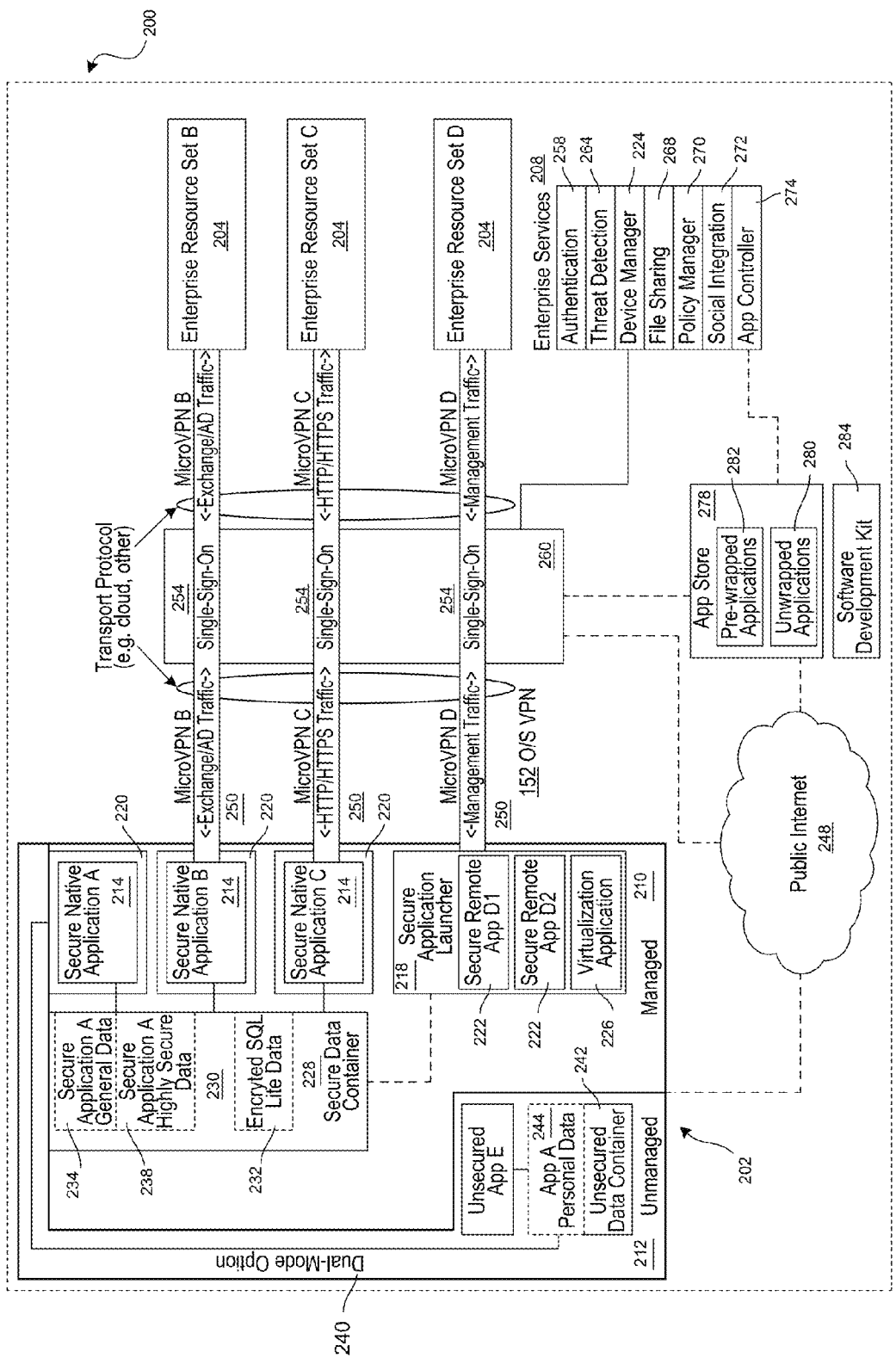
FIG. 2 depicts an illustrative enterprise mobility management system.

FIG. 2 represents an enterprise mobility technical architecture 200 for use in a BYOD environment. The architecture enables a user of a mobile device 202 to both access enterprise or personal resources from a mobile device 202 and use the mobile device 202 for personal use. The user may access such enterprise resources 204 or enterprise services 208 using a mobile device 202 that is purchased by the user or a mobile device 202 that is provided by the enterprise to the user. The user may utilize the mobile device 202 for business use only or for business and personal use. The mobile device may run an iOS operating system, Android operating system, and/or the like. The enterprise may choose to implement policies to manage the mobile device 204. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 204 that is managed through the application of mobile device management policies may be referred to as an enrolled device or a managed device.

In some embodiments, the operating system of the mobile device may be separated into a managed partition 210 and an unmanaged partition 212. The managed partition 210 may have policies applied to it to secure the applications running on and data stored in the managed partition. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The applications running on the managed partition may be secure applications. The secure applications may be email applications, web browsing applications, software-as-a-service (SaaS) access applications, Windows Application access applications, and the like. The secure applications may be secure native applications 214, secure remote applications 222 executed by a secure application launcher 218, virtualization applications 3226 executed by a secure application launcher 218, and the like. The secure native applications 214 may be wrapped by a secure application wrapper 220. The secure application wrapper 220 may include integrated policies that are executed on the mobile device 202 when the secure native application is executed on the device. The secure application wrapper 220 may include meta-data that points the secure native application 214 running on the mobile device 202 to the resources hosted at the enterprise that the secure native application 214 may require to complete the task requested upon execution of the secure native application 214. The secure remote applications 222 executed by a secure application launcher 218 may be executed within the secure application launcher application 218. The virtualization applications 3226 executed by a secure application launcher 218 may utilize resources on the mobile device 202, at the enterprise resources 204, and the like. The resources used on the mobile device 202 by the virtualization applications 226 executed by a secure application launcher 218 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 204, and the like. The resources used at the enterprise resources 204 by the virtualization applications 226 executed by a secure application launcher 218 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The secure applications may access data stored in a secure data container 228 in the managed partition 210 of the mobile device. The data secured in the secure data container may be accessed by the secure wrapped applications 214, applications executed by a secure application launcher 218, virtualization applications 226 executed by a secure application launcher 218, and the like. The data stored in the secure data container 228 may include files, databases, and the like. The data stored in the secure data container 228 may include data restricted to a specific secure application 230, shared among secure applications 232, and the like. Data restricted to a secure application may include secure general data 234 and highly secure data 238. Secure general data may use a strong form of encryption such as AES 128-bit encryption or the like, while highly secure data 238 may use a very strong form of encryption such as AES 254-bit encryption. Data stored in the secure data container 228 may be deleted from the device upon receipt of a command from the device manager 224. The secure applications may have a dual-mode option 240. The dual mode option 240 may present the user with an option to operate the secured application in an unsecured mode. In an unsecured mode, the secure applications may access data stored in an unsecured data container 242 on the unmanaged partition 212 of the mobile device 202. The data stored in an unsecured data container may be personal data 244. The data stored in an unsecured data container 242 may also be accessed by unsecured applications 248 that are running on the unmanaged partition 212 of the mobile device 202. The data stored in an unsecured data container 242 may remain on the mobile device 202 when the data stored in the secure data container 228 is deleted from the mobile device 202. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 204 and enterprise services 208 at an enterprise, to the public Internet 248, and the like. The mobile device may connect to enterprise resources 204 and enterprise services 208 through virtual private network connections. The virtual private network connections (also referred to at microVPN or application-specific VPN) may be specific to particular applications 250, particular devices, particular secured areas on the mobile device, and the like (e.g., 252). For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 254. The single-sign-on processes may allow a user to provide a single set of authentication credentials, which are then verified by an authentication service 258. The authentication service 258 may then grant to the user access to multiple enterprise resources 204, without requiring the user to provide authentication credentials to each individual enterprise resource 204.

The virtual private network connections may be established and managed by an access gateway 260. The access gateway 260 may include performance enhancement features that manage, accelerate, and improve the delivery of enterprise resources 204 to the mobile device 202. The access gateway may also re-route traffic from the mobile device 202 to the public Internet 248, enabling the mobile device 202 to access publicly available and unsecured applications that run on the public Internet 248. The mobile device may connect to the access gateway via a transport network 262. The transport network 262 may be a wired network, wireless network, cloud network, local area network, metropolitan area network, wide area network, public network, private network, and the like.

The enterprise resources 204 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 204 may be premise-based resources, cloud based resources, and the like. The enterprise resources 204 may be accessed by the mobile device 202 directly or through the access gateway 260. The enterprise resources 204 may be accessed by the mobile device 202 via a transport network 262. The transport network 262 may be a wired network, wireless network, cloud network, local area network, metropolitan area network, wide area network, public network, private network, and the like.

The enterprise services 208 may include authentication services 258, threat detection services 264, device manager services 224, file sharing services 268, policy manager services 270, social integration services 272, application controller services 274, and the like. Authentication services 258 may include user authentication services, device authentication services, application authentication services, data authentication services and the like. Authentication services 258 may use certificates. The certificates may be stored on the mobile device 202, by the enterprise resources 204, and the like. The certificates stored on the mobile device 202 may be stored in an encrypted location on the mobile device, the certificate may be temporarily stored on the mobile device 202 for use at the time of authentication, and the like. Threat detection services 264 may include intrusion detection services, unauthorized access attempt detection services, and the like. Unauthorized access attempt detection services may include unauthorized attempts to access devices, applications, data, and the like. Device management services 224 may include configuration, provisioning, security, support, monitoring, reporting, and decommissioning services. File sharing services 268 may include file management services, file storage services, file collaboration services, and the like. Policy manager services 270 may include device policy manager services, application policy manager services, data policy manager services, and the like. Social integration services 272 may include contact integration services, collaboration services, integration with social networks such as Facebook, Twitter, and LinkedIn, and the like. Application controller services 274 may include management services, provisioning services, deployment services, assignment services, revocation services, wrapping services, and the like.

The enterprise mobility technical architecture 200 may include an application store 278. The application store 278 may include unwrapped applications 280, pre-wrapped applications 282, and the like. Applications may be populated in the application store 278 from the application controller 274. The application store 278 may be accessed by the mobile device 202 through the access gateway 260, through the public Internet 248, or the like. The application store may be provided with an intuitive and easy to use user interface. The application store 278 may provide access to a software development kit 284. The software development kit 284 may provide a user the capability to secure applications selected by the user by wrapping the application as described previously in this description. An application that has been wrapped using the software development kit 284 may then be made available to the mobile device 202 by populating it in the application store 278 using the application controller 274.

The enterprise mobility technical architecture 200 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 3:
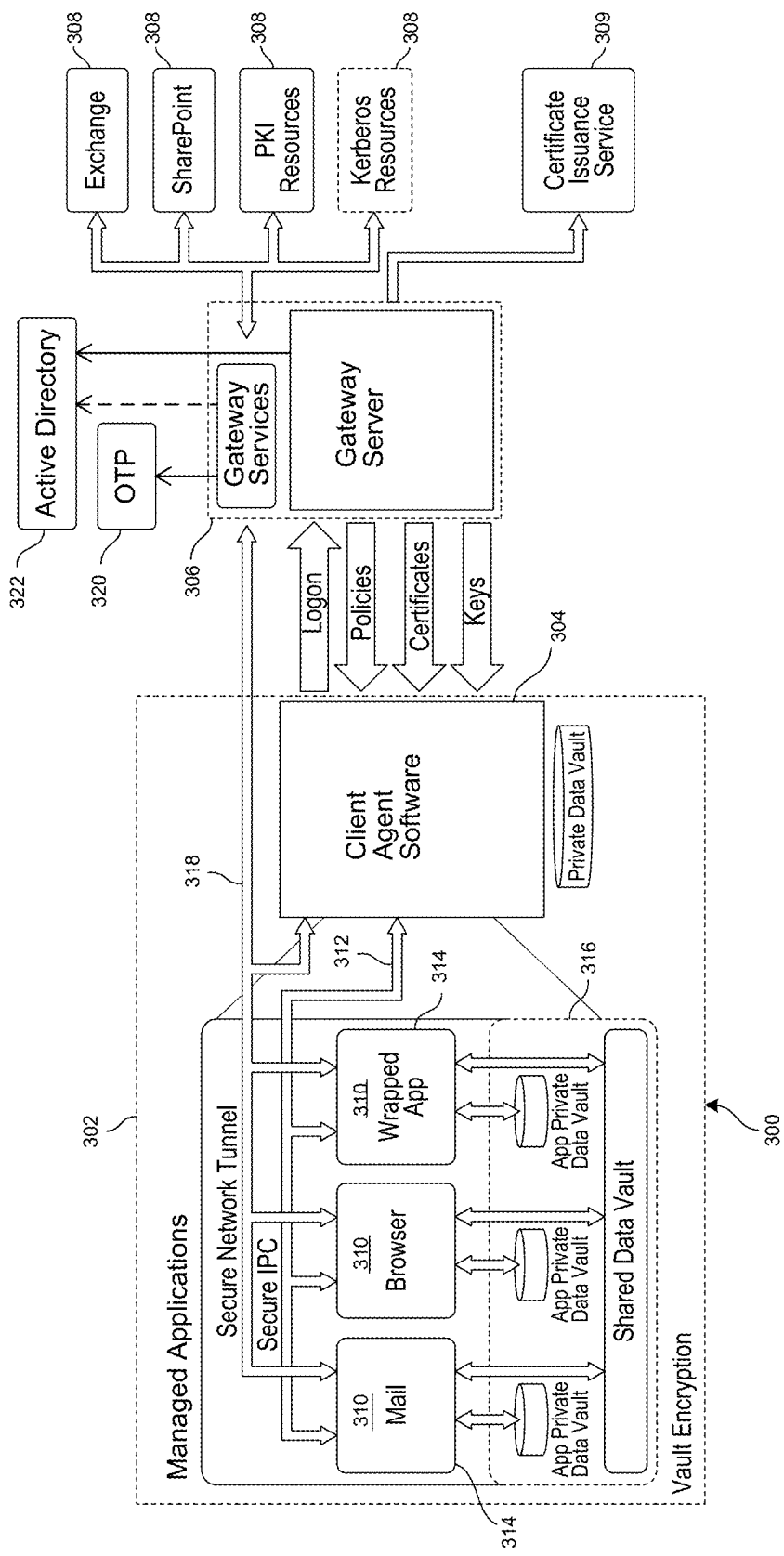
FIG. 3 depicts another illustrative enterprise mobility management system.

FIG. 3 is another illustrative enterprise mobility management system 300. Some of the components of the mobility management system 200 described above with reference to FIG. 2 have been omitted for the sake of simplicity. The architecture of the system 300 depicted in FIG. 3 is similar in many respects to the architecture of the system 200 described above with reference to FIG. 2 and may include additional features not mentioned above.

In this case, the left hand side represents an enrolled/managed mobile device 302 with a client agent 304, which interacts with gateway server 306 (which includes access gateway and application controller functionality) to access various enterprise resources 308 and services 309 such as Exchange, Sharepoint, PKI Resources, Kerberos Resources, and Certificate Issuance Service, as shown on the right hand side above. Although not specifically shown, the mobile device 302 may also interact with an enterprise application store (e.g., StoreFront) for the selection and downloading of applications.

The client agent 304 acts as the UI (user interface) intermediary for Windows apps/desktops hosted in an Enterprise data center, which are accessed using the HDX/ICA display remoting protocol. The client agent 304 also supports the installation and management of native applications on the mobile device 302, such as native iOS or Android applications. For example, the managed applications 310 (mail, browser, wrapped application) shown in the figure above are all native applications that execute locally on the device. Client agent 304 and the application management framework (AMF) of this architecture act to provide policy driven management capabilities and features such as connectivity and SSO (single sign on) to enterprise resources/services 308. The client agent 304 handles primary user authentication to the enterprise, normally to the access gateway (AG) with SSO to other gateway server components. The client agent 304 obtains policies from gateway server 306 to control the behavior of the AMF managed applications 310 on the mobile device 302.

The secure IPC links 312 between the native applications 310 and client agent 304 represent a management channel, which allows client agent to supply policies to be enforced by the application management framework 314 "wrapping" each application. The IPC channel 312 also allows client agent 304 to supply credential and authentication information that enables connectivity and SSO to enterprise resources 308. Finally the IPC channel 312 allows the application management framework 314 to invoke user interface functions implemented by client agent 304, such as online and offline authentication.

Communications between the client agent 304 and gateway server 306 are essentially an extension of the management channel from the application management framework 314 wrapping each native managed application 310. The application management framework 314 requests policy information from client agent 304, which in turn requests it from gateway server 306. The application management framework 314 requests authentication, and client agent 304 logs into the gateway services part of gateway server 306 (also known as NetScaler Access Gateway). Client agent 304 may also call supporting services on gateway server 306, which may produce input material to derive encryption keys for the local data vaults 316, or provide client certificates which may enable direct authentication to PKI protected resources, as more fully explained below.

In more detail, the application management framework 314 "wraps" each managed application 310. This may be incorporated via an explicit build step, or via a post-build processing step. The application management framework 314 may "pair" with client agent 304 on first launch of an application 310 to initialize the secure IPC channel and obtain the policy for that application. The application management framework 314 may enforce relevant portions of the policy that apply locally, such as the client agent login dependencies and some of the containment policies that restrict how local OS services may be used, or how they may interact with the application 310.

The application management framework 314 may use services provided by client agent 304 over the secure IPC channel 312 to facilitate authentication and internal network access. Key management for the private and shared data vaults 316 (containers) may be also managed by appropriate interactions between the managed applications 310 and client agent 304. Vaults 316 may be available only after online authentication, or may be made available after offline authentication if allowed by policy. First use of vaults 316 may require online authentication, and offline access may be limited to at most the policy refresh period before online authentication is again required.

Network access to internal resources may occur directly from individual managed applications 310 through access gateway 306. The application management framework 314 is responsible for orchestrating the network access on behalf of each application 310. Client agent 304 may facilitate these network connections by providing suitable time limited secondary credentials obtained following online authentication. Multiple modes of network connection may be used, such as reverse web proxy connections and end-to-end VPN-style tunnels 318.

The mail and browser managed applications 310 have special status and may make use of facilities that might not be generally available to arbitrary wrapped applications. For example, the mail application may use a special background network access mechanism that allows it to access Exchange over an extended period of time without requiring a full AD logon. The browser application may use multiple private data vaults to segregate different kinds of data.

This architecture supports the incorporation of various other security features. For example, gateway server 306 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 306 may identify managed native applications 310 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 316 (containers) on the mobile device 302. The vaults 316 may be encrypted so that all on-device data including files, databases, and configurations are protected. For on-line vaults, the keys may be stored on the server (gateway server 306), and for off-line vaults, a local copy of the keys may be protected by a user password. When data is stored locally on the device 302 in the secure container 316, it is preferred that a minimum of AES 256 encryption algorithm be utilized.

Other secure container features may also be implemented. For example, a logging feature may be included, wherein all security events happening inside an application 310 are logged and reported to the backend. Data wiping may be supported, such as if the application 310 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 314 may be prevented in other ways. For example, when an application 310 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 320 without the use of an AD (active directory) 322 password for access to one or more applications. In some cases, some users do not know (or are not permitted to know) their AD password, so these users may authenticate using an OTP 320 such as by using a hardware OTP system like SecurID (OTPs may be provided by different vendors also, such as Entrust or Gemalto). In some cases, after a user authenticates with a user ID, a text is sent to the user with an OTP 320. In some cases, this may be implemented only for online use, with a prompt being a single field.

An offline password may be implemented for offline authentication for those applications 310 for which offline use is permitted via enterprise policy. For example, an enterprise may want the enterprise application store to be accessed in this manner. In this case, the client agent 304 may require the user to set a custom offline password and the AD password is not used. Gateway server 306 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 310 as secondary credentials (for the purpose of accessing PKI protected web resources via the micro VPN feature). For example, an email application may utilize such a certificate. In this case, certificate-based authentication using ActiveSync protocol may be supported, wherein a certificate from the client agent 304 may be retrieved by gateway server 306 and used in a keychain. Each managed application may have one associated client certificate, identified by a label that is defined in gateway server 306.

Gateway server 306 may interact with an enterprise special purpose web service to support the issuance of client certificates to allow relevant managed applications to authenticate to internal PKI protected resources.

The client agent 304 and the application management framework 314 may be enhanced to support obtaining and using client certificates for authentication to internal PKI protected network resources. More than one certificate may be supported, such as to match various levels of security and/or separation requirements. The certificates may be used by the mail and browser managed applications, and ultimately by arbitrary wrapped applications (provided those applications use web service style communication patterns where it is reasonable for the application management framework to mediate HTTPS requests).

Client certificate support on iOS may rely on importing a PKCS 12 BLOB (Binary Large Object) into the iOS keychain in each managed application for each period of use. Client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 302 is authenticated to the enterprise, and vice versa. Virtual smart cards for authentication to gateway server 306 may also be implemented.

Both limited and full Kerberos support may be additional features. The full support feature relates to an ability to do full Kerberos login to AD 322, using an AD password or trusted client certificate, and obtain Kerberos service tickets to respond to HTTP negotiate authentication challenges. The limited support feature relates to constrained delegation in AFEE, where AFEE supports invoking Kerberos protocol transition so it can obtain and use Kerberos service tickets (subject to constrained delegation) in response to HTTP negotiate authentication challenges. This mechanism works in reverse web proxy (a.k.a. CVPN) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 310 is not running.

A multi-site architecture or configuration of the enterprise application store and application controller may be supported that allows users to be service from one of several different locations in case of failure.

In some cases, managed applications 310 may be allowed to access a certificate and private key via an API (example OpenSSL). Trusted managed applications 310 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Automatic Destruction of Data

As discussed above, a managed application may execute on a device connected to a secure network, and the operation of the managed application in accordance with one or more policy files may prevent data leakage from the secure network. Without a secured environment (e.g., as may be provided in the managed application context), a data message still may be sent securely over an unsecured network or to an unsecured device in a manner that prevents data leakage as described herein. These unsecured devices may include BYOD devices, public terminals or devices from which data is accessed, and the like.

Figure 4:
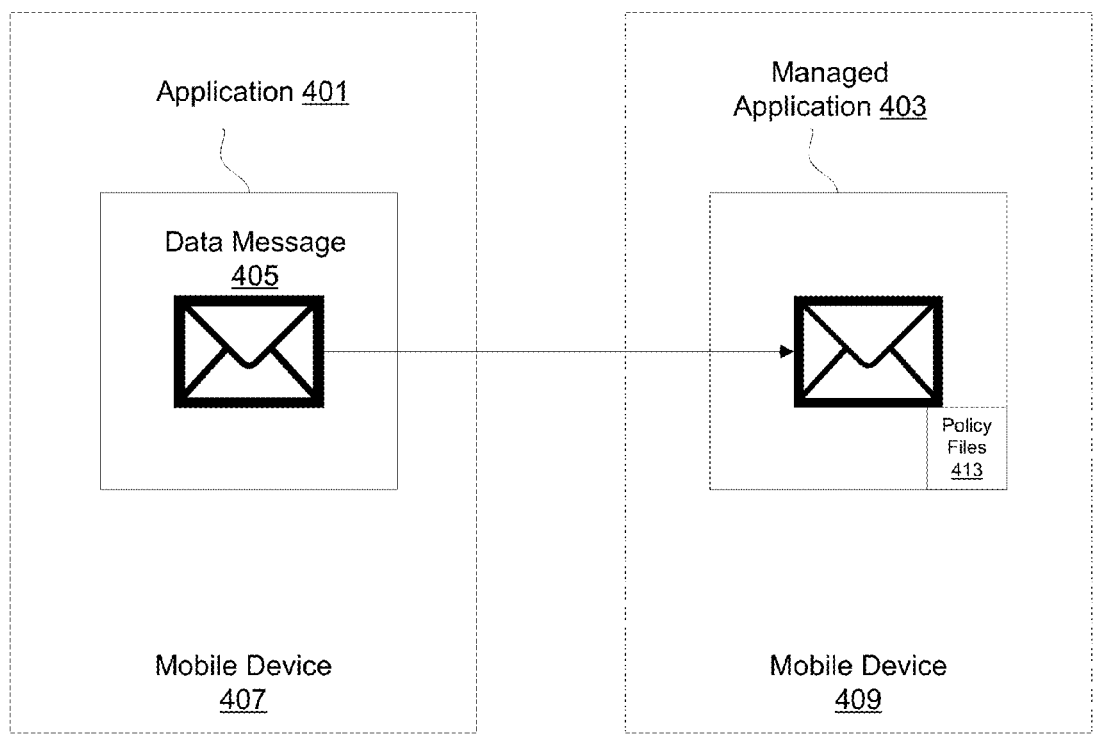
FIG. 4 depicts an illustrative data message transference between an application and a managed application on mobile devices.

In one embodiment, a first application 401, which may or might not be a managed application, may securely send a data message 405 to a managed application 403, as depicted in FIG. 4. Once application 401 creates data message 405, first application 401 may send data message 405 to managed applications on other mobile devices. In this embodiment, managed application 403 operates in accordance with policy files 413. Policy files 413 may include destruction criteria to be used upon receipt of data message 405. These policy files 413 may instruct managed application 403 to delete a data message when certain destruction criteria are met. The deletion may be a complete wipe or removal of data message 405 from second device 409. Also, the deletion simply may be a deletion of data message 405 from managed application 403.

First application 401 may include criteria as to which managed application may receive data message 405. Further, first application 401 may include criteria as to which mobile devices may be sent data message 405. If first application 401 is a managed application, the policy files associated with first application 401 may include instructions as to these criteria and serve to prevent data message 405 from being sent to or accessible by an unmanaged application.

In one embodiment, first managed application 401 may include a list of appropriate managed applications to which it is permissible to send data message 405. For example, an application that delivers email might only be allowed to send to managed applications that handle email. In contrast, an application that involves secure browsing of a network may only be permitted to send to managed applications that allow secure browsing of the same network. If first application 401 is a managed application, its policy files may include an instruction that states that first application 401 may only send data messages to other instances of that managed application executing on another device. Further examples may involve any type of application that sends or receives data messages.

A user on a first device 407 might select a managed application 403 or a second device 409 (e.g., the user might select a user/recipient, and the associated device(s) may be determined automatically as in traditional email systems) to which to send data message 405. Managed application 403 or second device 409 might not be included as possible receivers in first application 401. In that case, first application 401 may produce an error message on first device 407. That error message may include an option to select a different managed application/device. Also, data message 405 may be sent to managed application 403 that lacks instructions as to how to handle data message 405. In that case, policy files 413 of managed application 403 may include instructions to send, to first device 407, an error message. This error message may be related to the user by use of a pop-up window. Managed application 403 on second device 409 may also send an error message to a second user using second device 409.

Similarly, the first user may select a second user to whom to send data message 405. There may be several devices associated with the second user. In one embodiment, the first user may select which device, second device 409, to which to send data message 405. In another embodiment, first application 401, on first device 407, will query all of the second user's known devices for a managed application that may handle data message 405. Policy files 413 of the managed applications running in the background of second device 409 will determine which managed application will receive data message 405. For example, policy files 413 may dictate which data files certain managed application 403 will accept. If on second device 409, there is no managed application that can accept data message 405, the first user may receive an error message. If there is a managed application, managed application 403, that can handle data message 405, first application 401 may send data message 405 to managed application 403. If multiple managed applications can handle data message 405, first application 401 may choose at least one managed application to which to send data message 405. Alternatively, policy files 413 may instruct each managed application as to its level of priority in accepting data message 405. If the criteria in policy files 413 are met, managed application 403 will delete data message 405.

For example, in one embodiment, policy files 413 may instruct managed application 403 to delete a data message sent from at least one particular application. Additionally, policy files 413 may instruct managed application 403 to delete data messages from every application other than at least one particular application. Upon receiving a data message from first application 401 that meets destruction criteria, managed application 403 may send an error message back to first application 401. This error message may be viewed by a user of mobile device 407, which executes first application 401. In addition, managed application 403 may send an error message to a user of mobile device 409. Further, policy files 413 may instruct managed application 403 to send a message to the user of mobile device 407 stating from which applications managed application 403 will delete data messages 405. This message may be in the form of a pop-up window. Further, managed application 403 may send the user of mobile device 409 a message stating from which applications managed application 403 will delete data messages 405. Also, if data message 405 meets certain destruction criteria, managed application 403 may send a message to the user of mobile device 407 stating that data message 405 has been deleted.

For example, policy files 413 could instruct managed application 403 only to keep data messages 405 from applications that send emails. In contrast, a managed application that involves secure browsing of a network may only keep data messages from applications that involve browsing of a network. In addition, policy files 413 may instruct managed application 403 only to accept messages of other instances of that managed application executing on another device.

In one embodiment, policy files 413 may include a criterion for receipt from a particular device. For example, policy files 413 may instruct managed application 403 only to keep data messages from mobile devices belonging to certain users. In addition, policy files 413 may instruct managed application 403 only to keep data messages from mobile devices of certain types. For example, managed application 403 may be able to determine what type of mobile device is executing managed application 403. Managed application 403 may then only accept data messages from the same make and model device. In addition, managed application 403 may send a message to the user of device 409 stating which device is sending data message 405.

The criteria could include a criterion for a length of time restriction. For example, policy files 413 may include in its criteria that data message 405 can only be viewed by a user for five seconds. Policy files 413 may also include in its criteria that data message 405 may only be stored on second device 409 for two hours. Both of these criteria may be in place at the same time. Other length of time restrictions may be treated similarly, including the length of time that the device is in use or idle. For example, the length of time restriction may instruct managed application 403 to allow storage on a device in use for only ten seconds. However, the length of time restriction may instruct managed application 403 to allow storage on an idle device for twenty seconds. If the device is idle or if managed application 403 is not in use, managed application 403 may process, in the background of the device, the length of time stored.

The length of time restriction may include a secondary criterion based on the size of data message 405. For example, if a particularly large data message is sent to managed application 403, policy files 413 may make that data message available for a certain amount of time in order to preserve confidentiality of data message 405, which may contain sensitive material. This secondary criterion may be applied to most if not all criteria discussed in this disclosure.

Further, the criteria could include a criterion for a number of views restriction. A number of views restriction may include restricting a number of views by a user to a number (e.g. three) of direct views of data message 405. Other restrictions may include the number of times that a user uses second device 409 whether viewing data message 405 or not. Further, the number of views restriction may refresh itself to three every time data message 405 is forwarded to a new managed application. In contrast, the number of views may decrement each time any user views the message from a managed application instructed by the same criterion.

Policy files 413 also could include a criterion for a known security threat on managed application 403 or on second device 409. Known security threats may include the presence of malware or other executable files in data message 405. A security threat may also include a user attempting to debug data message 405 or attempting to decrypt an encryption. Further, a known security threat may include the attempt, of a user in possession of second device 409, to forward the message or to open data message 405 with another application. A known security threat may encompass any security threat applicable to applications and mobile devices.

Figure 5A:
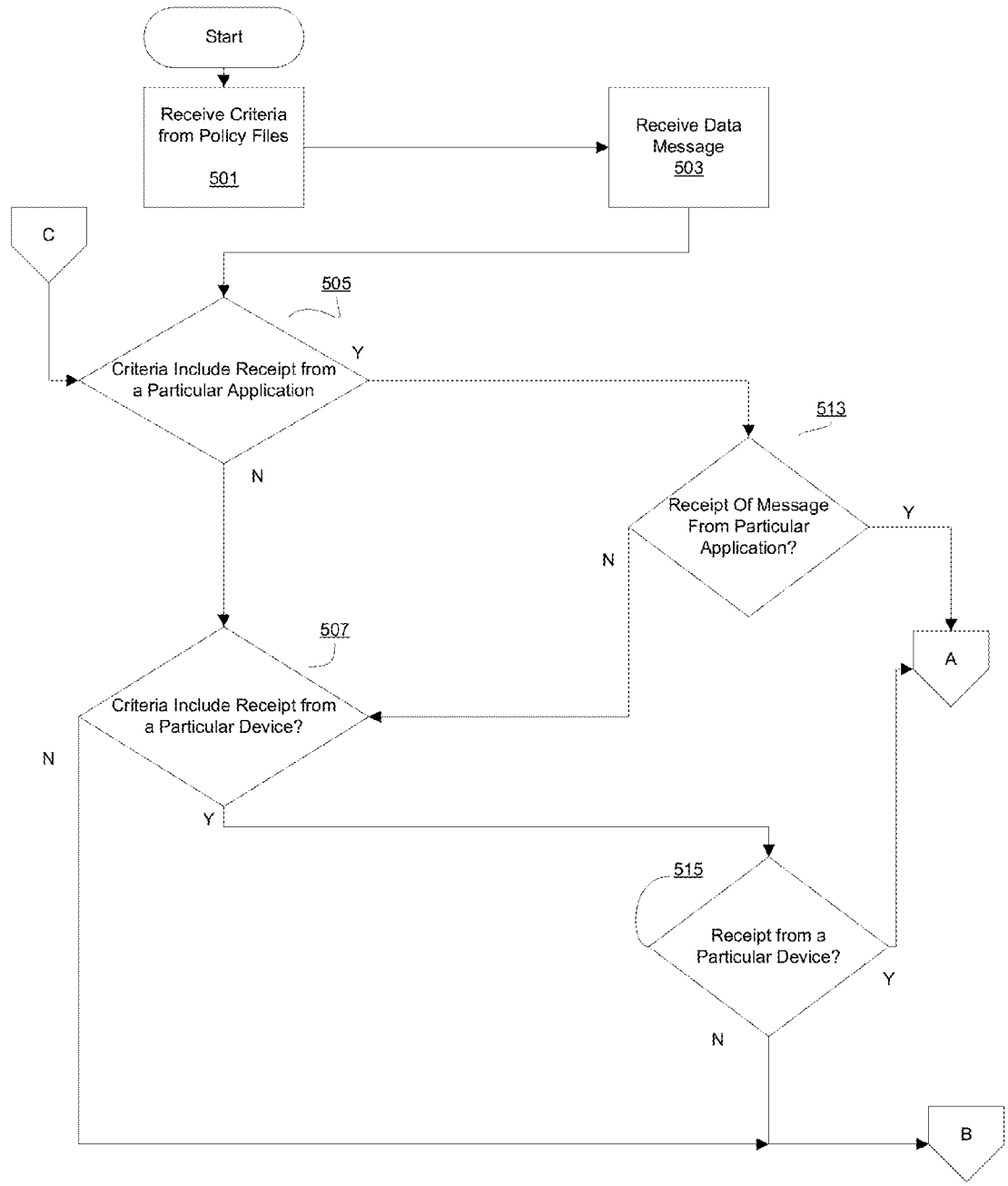
FIGS. 5A-5B depict a method in which a data message is deleted if certain criteria in the managed application's policy files are met.
Figure 5B:
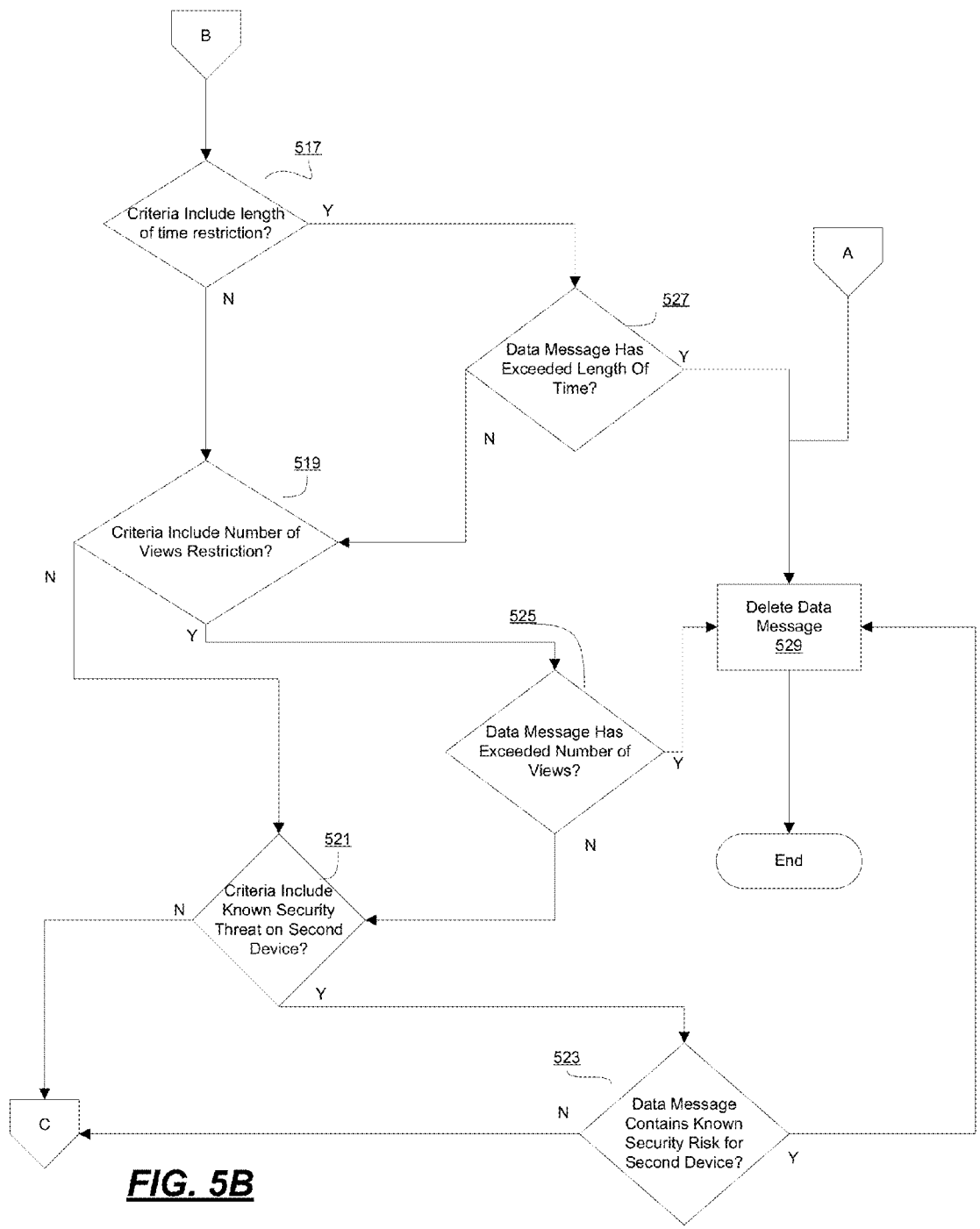

FIG. 5 depicts a flowchart involving receipt and handling of data message 405 by the managed application 403 on second device 409. In step 501, second device 409 receives policy files 413 that will instruct managed application 403 as to how to handle data message 405. Data message 405 is then created by application 401. Policy files 413 will instruct managed application 403 as to what destruction criteria to apply to data message 405. In step 503, managed application 403 receives data message 405. These criteria may include any criterion that will lead to the destruction of the message.

In step 505, managed application 403 determines whether policy files 413 include a criterion for receipt from a particular application as discussed above. If so, managed application may move to step 513. In step 513, managed application 403 may determine whether data message 405 meets the criterion. If data message 405 meets the criterion, managed application 403 may proceed to step 529 and delete data message 405. If policy files 413 do not include such a criterion, or if data message 405 does not meet the criterion, managed application 403 may move to step 507.

In step 507, managed application 403 determines whether policy files 413 include a criterion for receipt from a particular device. If so, managed application 403 may move to step 515. In step 515, managed application 403 may determine whether data message 405 meets the criterion. If so, managed application 403 may move to step 529 and delete data message 405. If policy files 413 do not include such a criterion, or if data message 405 does not meet the criterion, managed application 403 may move to step 517.

In step 517, managed application 403 may determine whether policy files 413 include a length of time restriction. If so, managed application 403 may move to step 527. In step 527, managed application 403 may determine whether data message 405 meets the criterion. If so, managed application 403 may move to step 529 and delete data message 405. If policy files 413 do not include such a criterion, or if data message 405 does not meet the criterion, managed application 403 may move to step 519.

In step 519, managed application 403 determines whether policy files 413 include a criterion for a number of views restriction. If the criterion exists, managed application 403 then proceeds to step 525 where it determines whether the number of views of data message 405 has exceeded the allowable number of views. In this embodiment, if data message 405 has exceeded the maximum number of views, managed application 403 proceeds to step 529, where managed application 403 deletes data message 405.

If the criterion in step 525 has not been met, or if data message 405 does not contain a number of views restriction, managed application 403 proceeds to step 521 where it will determine whether policy files 413 include a criterion for a known security threat on managed application 403 or on second device 409. If the criterion exists, managed application 403 then proceeds to step 523 where managed application 403 determines if data message 405 contains a known security risk. Should data message 405 include a known security risk listed in the criteria, managed application 403 will proceed to step 529. Managed application 403 will then delete data message 405. If managed application 403 does not detect a known security risk in data message 405 or if data message 405 lacks a criterion for a known security threat, managed application 403 will create a second iteration of the process starting at step 505. Other criteria may be included or substituted for the steps in FIG. 5.

Figure 6:
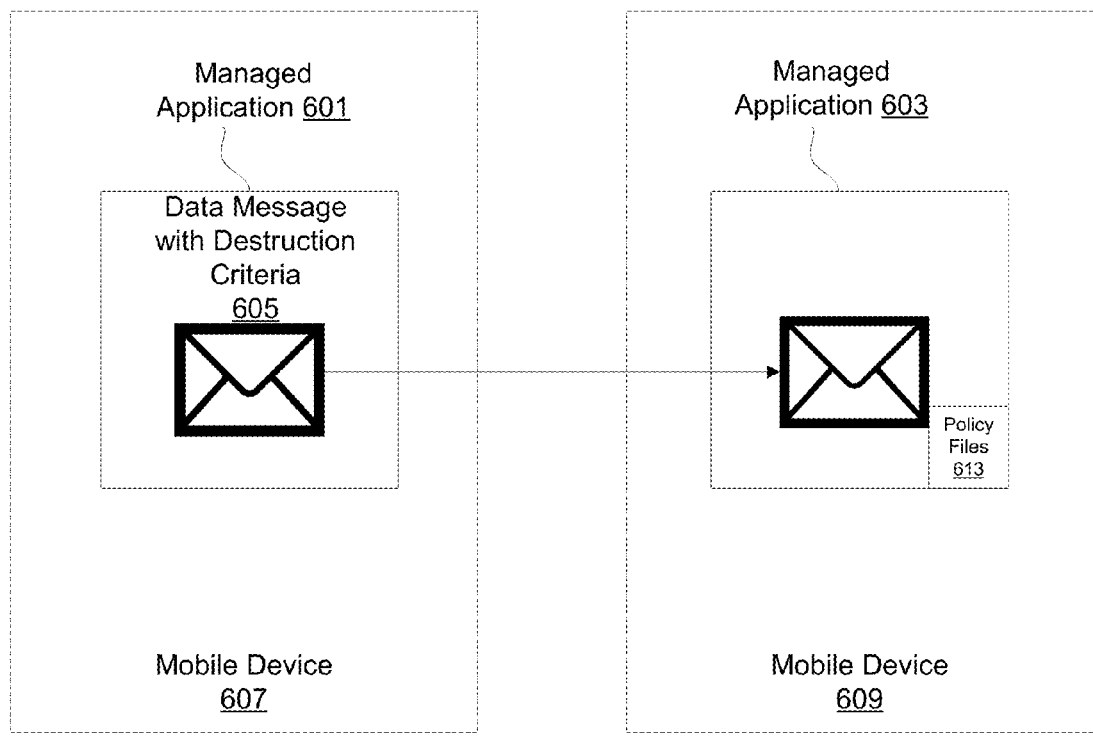
FIG. 6 depicts an illustrative data message transfer between an application and a managed application on mobile devices such that the data message includes destruction criteria.

In another embodiment, a first application 601 may include destruction criteria in a data message 605 that first application 601 sends to managed application 603 as depicted in FIG. 6. These destruction criteria may be included by the use of meta tags or any other method with which destruction criteria may be inserted into data message 605. First application 601 may be a managed or unmanaged application. If first application 601 is a managed application, policy files associated with first application 601 may include destruction criteria to be encoded into data message 605, which is to be sent to another managed application or device. These policy files further may include instructions as to how to create and secure data message 605. Once data message 605 has been created, data message 605 may be sent to managed applications on other mobile devices. First application 601 may only be able to send data message 605 to certain managed application. For example, if first application 601 is a managed application, the policy files associated with first application 601 may include criteria as to which other managed applications may receive data message 605. These policy files may also include criteria as to which other managed applications may receive data message 605. Further, these policy files serve to prevent data message 405 from being sent to or accessible by an unmanaged application.

Figure 7A:
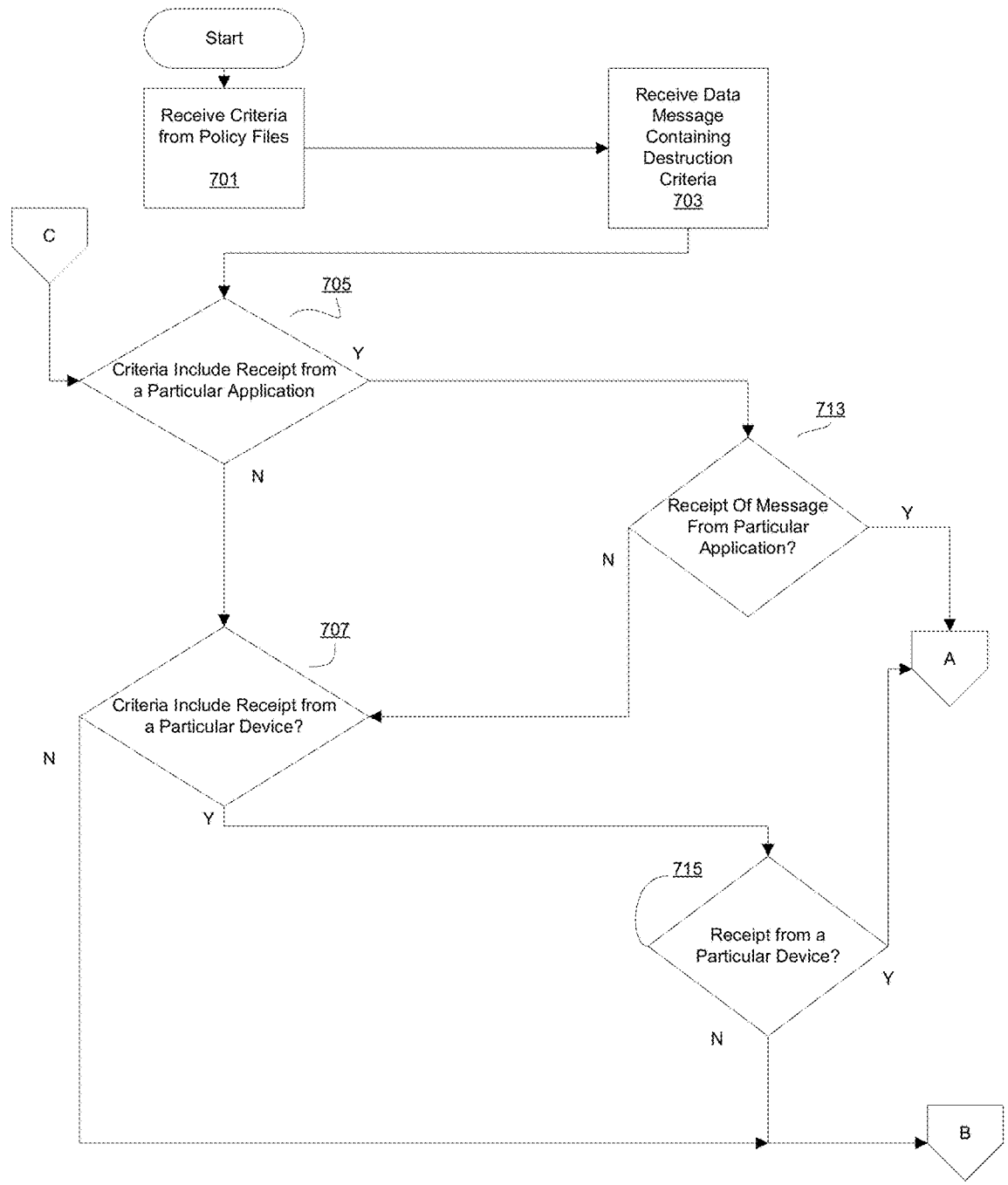
FIGS. 7A-7B depict a method in which a data message is deleted if certain criteria in the policy files and the data message are met.
Figure 7B:
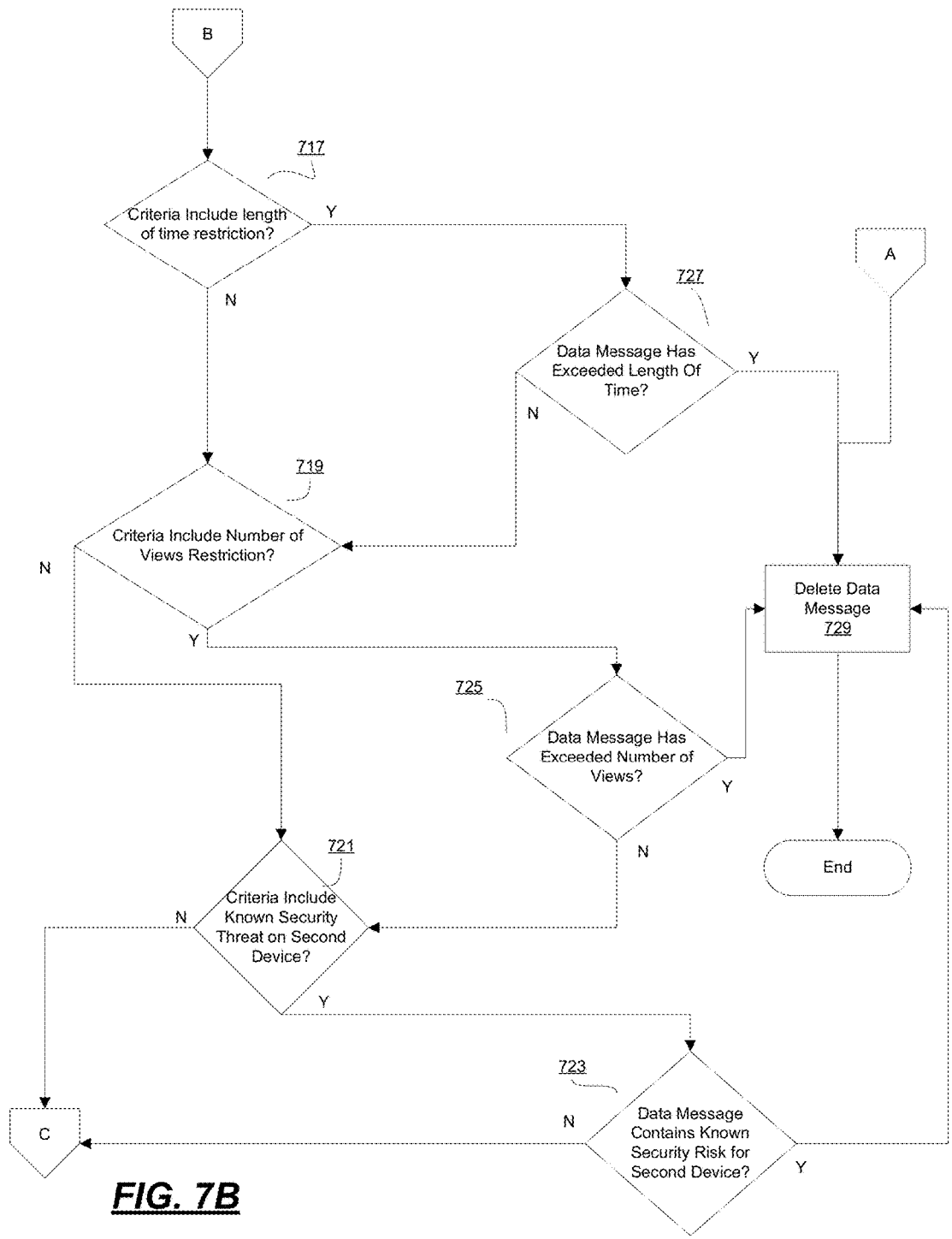

FIG. 7 depicts a flowchart involving the receipt and handling of data message 605 by managed application 603 on second device 609. In step 701, second device 609 receives policy files 613 that will instruct managed application 603 as to how to handle data message 605. Data message 605 is then created by first application 601 with destruction criteria. These criteria could include any criterion that will lead to the destruction of the message First application 601 then sends data message 605 to managed application 603. In step 703, managed application 603 receives data message 605 containing the destruction criteria. In one embodiment, in step 705, managed application 603 determines whether the data message 605, includes a criterion involving a particular application restriction.

In step 705, managed application 603 determines whether data message 405 includes a criterion for receipt from a particular application as discussed above. If so, managed application 603 may move to step 713. In step 713, managed application 603 may determine whether data message 605 meets the criterion. If data message 605 meets the criterion, managed application 603 may proceed to step 729 and delete data message 605. If data message 605 does not include such a criterion, or if data message 605 does not meet the criterion, managed application 603 may move to step 707.

In step 707, managed application 603 determines whether data message 605 includes a criterion for receipt from a particular device. If so, managed application 603 may move to step 715. In step 715, managed application 603 may determine whether data message 605 meets the criterion. If so, managed application 603 may move to step 729 and delete data message 605. If data message 605 does not include such a criterion, or if data message 405 does not meet the criterion, managed application 603 may move to step 717.

In step 717, managed application 603 may determine whether the data message includes a length of time restriction. If so, managed application 603 may move to step 727. In step 727, managed application 603 may determine whether data message 605 meets the criterion. If so, managed application 603 may move to step 729 and delete data message 605.

If the criterion in step 727 has not been met, of if data message 605 does not contain a length of time restriction, managed application 603 proceeds to step 719. In step 719, managed application 603 determines whether data message 605 includes a criterion for a number of views restriction. If the criterion exists, managed application 603 then proceeds to step 725 where it determines whether the number of views of data message 605 has exceeded the allowable number of views. In this embodiment, if data message 605 has exceeded the maximum number of views, managed application 603 proceeds to step 729, where managed application 603 deletes data message 605.

If the criterion in step 725 has not been met, or if data message 605 does not contain a number of views restriction, managed application 603 proceeds to step 721 where it will determine whether data message 605 includes a criterion for a known security threat on managed application 603 or on second device 609. If the criterion exists, managed application 603 then proceeds to step 723 where managed application 603 determines if data message 605 contains a known security risk. Should data message 605 include a known security risk listed in the criteria, managed application will proceed to step 729. Managed application 603 will then delete data message 605. If managed application 603 does not detect a known security risk in data message 605 or if data message 605 lacks a criterion for a known security threat, managed application 603 will create a second iteration of the process starting at step 705. Other criteria may be included or substituted for the steps in FIG. 7.

Another embodiment includes managed application 603 determining all the criteria before determining whether any criterion has been met, therefore performing steps 705, 707, 717, 719, and 721 before step 713, 715, 727, 725, or 723. Managed application 603 would then, in the second iteration, go from step 713 to 715 to 727 to 725 to 723, barring the deletion of data message 605. This embodiment would allow managed application 603 to eschew superfluous steps.

In another embodiment, managed application 603 would run through the complete iteration one time and in the second iteration would skip superfluous steps. For example, suppose in the first iteration, managed application 603 discovers, at step 717, that a length of time restriction does not exist in data message 605. In the second iteration, managed application 603 would thus skip steps 717 and 727 and go to the next useful step. This embodiment would further allow managed application 603 to avoid superfluous steps. Further embodiments with changes to the steps flowchart are encompassed in this disclosure.

Such embodiments regarding changing the steps of the flowchart in FIG. 7 may also be adapted for use in FIG. 5.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
executing a managed application on a mobile device, wherein the managed application is configured to operate in accordance with a set of one or more policy files defined independent of the managed application, wherein the one or more policy files restrict the managed application to accept messages only from other instances of the managed application executing on other devices, and wherein the one or more policy files configure the managed application to delete at least a payload of a data message when one or more of a plurality of destruction criteria are met, and wherein the data message is addressed from a first user to a second user;
receiving, by the mobile device as sent from a second mobile device, a request for a response indicating whether the mobile device includes at least one managed application capable of accepting the data message;
sending, by the mobile device, a response to the request that indicates whether the mobile device includes at least one managed application capable of accepting the data message;
receiving, when the response to request indicates that the mobile device includes at least one managed application capable of accepting the data message, the data message from an application on the second mobile device, wherein the data message specifies the plurality of destruction criteria; and
automatically deleting the payload when one or more of the plurality of destruction criteria are met by analyzing the payload for whether or not the payload meets any one of the plurality of destruction criteria in a predetermined order, starting with detection of a known security threat on the mobile device,
wherein the plurality of destruction criteria comprise: a) a length of time the payload has been viewed, b) a number of times the payload has been viewed, c) a length of time the payload has been stored on the mobile device since receipt of the payload by the mobile device, 4) a length of time the data message has been stored unopened on the mobile device, and 5) detection of a known security threat on the mobile device.

2. A method comprising:
executing a managed application on a mobile device, wherein the managed application is configured to operate in accordance with a set of one or more policy files defined independently of and received independently from the managed application, wherein the one or more policy files restrict the managed application to accept messages only from other instances of the managed application executing on other devices;
receiving, by the mobile device as sent from a second mobile device, a request for a response indicating whether the mobile device includes at least one managed application capable of accepting a message;
sending, by the mobile device, a response to the request that indicates whether the mobile device includes at least one managed application capable of accepting the message;
receiving, when the response to request indicates that the mobile device includes at least one managed application capable of accepting the message, a message from the second mobile device, said message comprising a data payload and a plurality of destruction criteria, wherein the plurality of destruction criteria are usable by the managed application to delete the data payload when one or more of the plurality of destruction criteria are met;
determining that one or more of the plurality of destruction criteria are met; and
deleting the data payload from the mobile device responsive to determining that one or more of the plurality of destruction criteria are met by analyzing the data payload for whether or not the data payload meets any one of the plurality of destruction criteria in a predetermined order, starting with detection of a known security threat on the mobile device,
wherein the plurality of destruction criteria comprise: a) a length of time the data payload has been viewed, b) a number of times the data payload has been viewed, c) a length of time the data payload has been stored on the mobile device since receipt of the data payload by the mobile device, 4) a length of time the message has been stored unopened on the mobile device, and 5) detection of a known security threat on the mobile device.

3. The method of claim 2, wherein the known security threat comprises predetermined executable code detected on the mobile device, and wherein the predetermined executable code comprises one of malware and a virus.

4. A computing device, comprising:
a processor;
a memory, storing computer readable instructions that, when executed by the processor, configure the computing device to:
execute a managed application, wherein the managed application is configured to operate in accordance with a set of one or more policy files defined independent of and received independent from the managed application, wherein the one or more policy files restrict the managed application to accept messages only from other instances of the managed application executing on other devices, and;

receiving, by the computing device as sent from a second computing device, a request for a response indicating whether the computing device includes at least one managed application capable of accepting a data message;

sending, by the computing device, a response to the request that indicates whether the computing device includes at least one managed application capable of accepting the data message;

receive a data message from the second computing device, wherein the data message comprises a data payload and a plurality of destruction criteria;

determine when one or more of the plurality of destruction criteria are met by analyzing the data payload for whether or not the data payload meets any one of the plurality of destruction criteria in a predetermined order, starting with detection of a known security threat on the computing device; and responsive to determining that one or more of the plurality of destruction criteria are met, automatically delete at least the data payload, wherein the plurality of destruction criteria comprise:
a) a length of time the data payload has been viewed,
b) a number of times the data payload has been viewed, c) a length of time the data payload has been stored on the computing device since receipt of the data payload by the computing device, 4) a length of time the message has been stored unopened on the computing device, and 5) detection of a known security threat on the computing device.

5. The computing device of claim 4, wherein responsive to the determining, the computing device automatically deletes all of the data message.

6. The method of claim 2, further comprising:
receiving a second message from the second mobile device, the second message comprising a second data payload and one or more of a plurality of second destruction criteria, wherein the plurality of second destruction criteria are usable by the managed application to delete the second data payload when one or more of the plurality of second destruction criteria are met;

determining that one or more of the plurality of second destruction criteria are met; and deleting the second data payload from the mobile device responsive to determining that one or more of the plurality of second destruction criteria are met.

7. The method of claim 1, wherein the plurality of destruction criteria further comprises a type of mobile device that sent the payload to the mobile device.

8. The method of claim 7, wherein the mobile device only deletes the payload when the type of the mobile device that sent the payload to the mobile device is a same as the type of the mobile device that received the payload.

* * * * *